United States Patent
Chu

(10) Patent No.: US 10,079,549 B1
(45) Date of Patent: Sep. 18, 2018

(54) SYNCHRONOUS RECTIFICATION CONTROLLER WITH PULL-UP AND PULL-DOWN CIRCUIT AND POWER CONVERSION APPARATUS HAVING THE SAME

(71) Applicant: Power Forest Technology Corporation, Hsinchu County (TW)

(72) Inventor: Kwan-Jen Chu, Hsinchu (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days.

(21) Appl. No.: 15/663,836

(22) Filed: Jul. 31, 2017

(30) Foreign Application Priority Data

May 16, 2017 (TW) .............................. 106116160 A

(51) Int. Cl.
*H02M 3/335* (2006.01)
(52) U.S. Cl.
CPC ................................ *H02M 3/33592* (2013.01)
(58) Field of Classification Search
CPC .......................................... H02M 3/335–3/432
See application file for complete search history.

(56) References Cited

U.S. PATENT DOCUMENTS

| 6,111,769 A | * | 8/2000 | Zhang | ..................... H02M 1/34 363/127 |
| 2011/0187416 A1 | * | 8/2011 | Bakker | ..................... G05F 1/10 327/109 |
| 2014/0192575 A1 | * | 7/2014 | Olivik | ............... H02M 3/33592 363/89 |

* cited by examiner

*Primary Examiner* — Gary L Laxton
*Assistant Examiner* — Peter Novak
(74) *Attorney, Agent, or Firm* — JCIPRNET

(57) ABSTRACT

A power conversion apparatus and a synchronous rectification (SR) controller thereof are provided. The SR controller includes a first control circuit, a second control circuit, a pull-up circuit and a pull-down circuit. The first control circuit generates a pull-up control signal and a first pull-down signal according to a drain voltage of an SR transistor and a first voltage. The second control circuit compares the drain voltage with a second voltage to generate a second pull-down signal, and selects one of the first pull-down signal and the second pull-down signal as a pull-down control signal. The pull-up circuit and the pull-down circuit regulate a driving voltage on a gate terminal of the SR transistor in response to the pull-up control signal and the pull-down control signal respectively.

11 Claims, 8 Drawing Sheets

SYNCHRONOUS RECTIFICATION CONTROLLER WITH PULL-UP AND PULL-DOWN CIRCUIT AND POWER CONVERSION APPARATUS HAVING THE SAME

CROSS-REFERENCE TO RELATED APPLICATION

This application claims the priority benefit of Taiwan application serial no. 106116160, filed on May 16, 2017. The entirety of the above-mentioned patent application is hereby incorporated by reference herein and made a part of this specification.

BACKGROUND OF THE INVENTION

Field of the Invention

The invention relates to a power supply apparatus, and particularly relates to a power conversion apparatus and a synchronous rectification (SR) controller thereof.

Description of Related Art

Power conversion apparatuses are an indispensable component in modern electronic apparatuses. In a power conversion apparatus based on pulse width modulation (PWM) control, a secondary side of the power conversion apparatus generally has a rectification diode. As the rectification diode has larger power consumption in an on state, a synchronous rectification (SR) transistor having lower on resistance can be used to replace the rectification diode. Under such a structure, an SR controller is also required for controlling on and off of the SR transistor of the secondary side.

In addition, a parasitic diode is provided between a drain terminal and a body terminal of the SR transistor. When energy stored on a primary side of the power conversion apparatus is transferred to the secondary side, the parasitic diode in the SR transistor will be turned on first, then the SR controller will turn on the SR transistor, causing cutoff of the parasitic diode. Similarly, power consumption of the parasitic diode in the on state is much greater as compared to power consumption of the SR transistor in the on state. Therefore, how to control the SR transistor appropriately so as to reduce power loss during power conversion is definitely one of the focuses of attention of those skilled in the art.

SUMMARY OF THE INVENTION

In view of the above, the invention provides a power conversion apparatus and synchronous rectification (SR) controller thereof. The SR controller correspondingly controls an SR transistor according to a drain voltage of the SR transistor, so as to enhance conversion efficiency of the power conversion apparatus.

The SR controller of the invention is used to drive the SR transistor. The SR controller includes a first control circuit, a second control circuit, a pull-up circuit and a pull-down circuit. The first control circuit is coupled to a drain terminal of the SR transistor to receive a drain voltage, and generates a pull-up control signal and a first pull-down signal according to the drain voltage and a first voltage. The second control circuit is coupled to the drain terminal of the SR transistor to receive the drain voltage, and coupled to the first control circuit to receive the first pull-down signal. The second control circuit compares the drain voltage with a second voltage to generate a second pull-down signal, and selects one of the first pull-down signal and the second pull-down signal as a pull-down control signal. The pull-up circuit is coupled between a power supply terminal and a gate terminal of the SR transistor, and coupled to the first control circuit to receive the pull-up control signal. The pull-down circuit is coupled between a ground terminal and the gate terminal of the SR transistor, and coupled to the second control circuit to receive the pull-down control signal. The pull-up circuit and the pull-down circuit regulate a driving voltage on the gate terminal of the SR transistor in response to the pull-up control signal and the pull-down control signal respectively.

In an embodiment of the invention, when the drain voltage is greater than the second voltage, the second control circuit outputs the second pull-down signal as the pull-down control signal, and the pull-down circuit turns off the SR transistor in response to the pull-down control signal.

In an embodiment of the invention, when the drain voltage is smaller than the second voltage, the second control circuit outputs the first pull-down signal as the pull-down control signal, and the pull-up circuit and the pull-down circuit turn on the SR transistor in response to the pull-up control signal and the pull-down control signal respectively.

The power conversion apparatus of the invention includes a transformer, the SR transistor and the aforementioned SR controller. The transformer has a primary side and a secondary side, wherein a first terminal of the primary side is configured to receive an input voltage, and a first terminal of the secondary side is configured to provide an output voltage to a load. The drain terminal of the SR transistor is coupled to a second terminal of the secondary side. A source terminal of the SR transistor is coupled to a ground terminal. A gate terminal of the SR transistor receives the driving voltage.

Based on the above, the power conversion apparatus and the SR controller thereof as proposed by an embodiment of the invention correspondingly control on and off of the SR transistor according to the drain voltage of the SR transistor, so as to enhance conversion efficiency of the power conversion apparatus.

In order to make the aforementioned features and advantages of the invention more comprehensible, embodiments accompanied with drawings are described in details below.

BRIEF DESCRIPTION OF THE DRAWINGS

The accompanying drawings below are a part of the specification of the invention, illustrating exemplary embodiments of the invention. The accompanying drawings, together with the description of the specification, serve to explain the principles of the invention.

DESCRIPTION OF EMBODIMENTS

Figure 1:
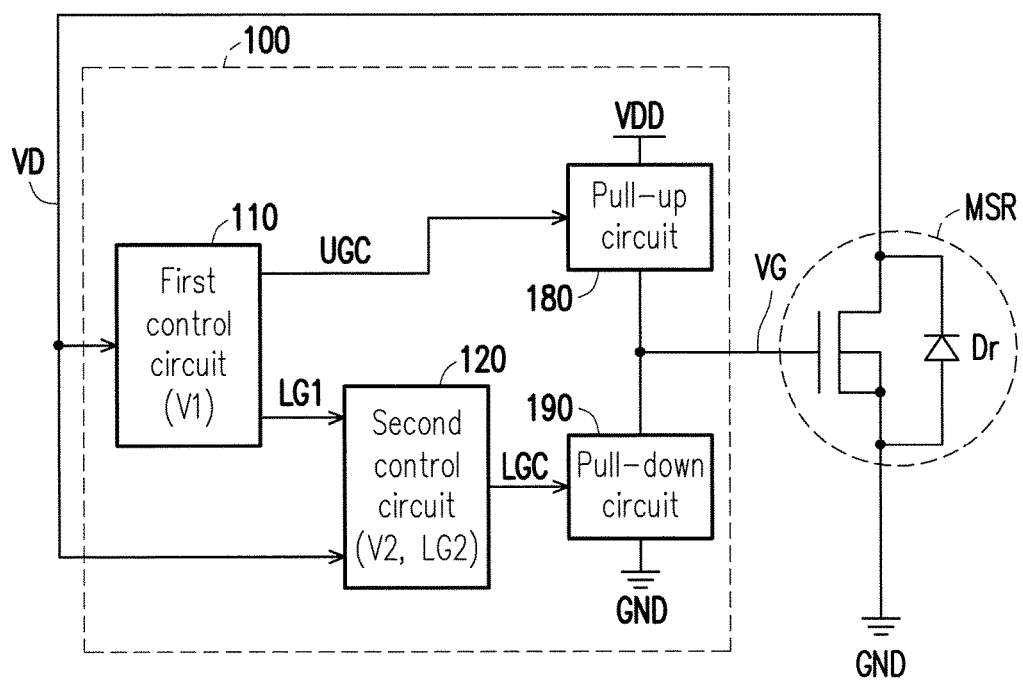
FIG. 1 is a schematic circuit block diagram of an SR controller according to an embodiment of the invention.

In order to make the invention more comprehensible, embodiments are described below as examples to demonstrate that the invention can indeed be realized. In addition, wherever appropriate in the drawings and embodiments, elements/components/steps with the same reference numerals represent the same or similar parts.

Referring to FIG. 1, FIG. 1 is a schematic circuit block diagram of an SR controller 100 illustrated in accordance with an embodiment of the invention. The SR controller 100 may be applied to a secondary side of a power conversion apparatus (not shown) so as to drive an SR transistor MSR of the secondary side, wherein a structure of the aforementioned power conversion apparatus may be a flyback type, a push-pull type, a forward type, a half-bridge type, a full-bridge type, or other types of structures. The invention does not limit the structure of the power conversion apparatus.

Specifically, the SR controller 100 is coupled to a drain terminal of the SR transistor MSR to receive a drain voltage VD, and coupled to a gate terminal of the SR transistor MSR to control on and off of the SR transistor MSR. In addition, a source terminal and a body terminal of the SR transistor MSR are coupled to a ground terminal GND, wherein a parasitic diode Dr is provided between the drain terminal and the body terminal of the SR transistor MSR. In an embodiment of the invention, the SR transistor MSR may be an N-type metal oxide semiconductor field effect transistor, but the invention is not limited thereto, and depends on the actual application or design requirements.

The SR controller 100 includes a first control circuit 110, a second control circuit 120, a pull-up circuit 180 and a pull-down circuit 190, but the invention is not limited thereto. The first control circuit 110 is coupled to the drain terminal of the SR transistor MSR to receive the drain voltage VD, and generates a pull-up control signal UGC and a first pull-down signal LG1 according to the drain voltage VD and a first voltage V1, wherein the pull-up control signal UGC and the first pull-down signal LG1 may be a differential pair of signals. The second control circuit 120 is coupled to the drain terminal of the SR transistor MSR to receive the drain voltage VD, and coupled to the first control circuit 110 to receive the first pull-down signal LG1. The second control circuit 120 compares the drain voltage VD with a second voltage V2 to generate a second pull-down signal LG2, and selects one of the first pull-down signal LG1 and the second pull-down signal LG2 as a pull-down control signal LGC. In an embodiment of the invention, the first voltage V1 and the second voltage V2 may be negative DC voltages, and the first voltage V1 is smaller than the second voltage V2, but the invention is not limited thereto.

The pull-up circuit 180 is coupled between a power supply terminal VDD and the gate terminal of the SR transistor MSR, and coupled to the first control circuit 110 to receive the pull-up control signal UGC. The pull-down circuit 190 is coupled between the ground terminal GND and the gate terminal of the SR transistor MSR, and coupled to the second control circuit 120 to receive the pull-down control signal LGC. The pull-up circuit 180 and the pull-down circuit 190 regulate a driving voltage VG on the gate terminal of the SR transistor MSR in response to the pull-up control signal UGC and the pull-down control signal LGC respectively, and accordingly control on and off of the SR transistor MSR.

In an embodiment of the invention, when the drain voltage VD is smaller than the second voltage V2, the second control circuit 120 outputs the first pull-down signal LG1 as the pull-down control signal LGC, and the pull-up circuit 180 and the pull-down circuit 190 turn on the SR transistor MSR in response to the pull-up control signal UGC and the pull-down control signal LGC (which is the first pull-down signal LG1 at this point) respectively. To be more specific, the first control circuit 110 amplifies a difference voltage between the drain voltage VD and the first voltage V1 to generate the pull-up control signal UGC and the first pull-down signal LG1. Moreover, when the drain voltage VD rises to the first voltage V1 (the drain voltage VD is still smaller than the second voltage V2 at this point), the pull-up circuit 180 and the pull-down circuit 190 regulate the driving voltage VG in response to the pull-up control signal UGC and the pull-down control signal LGC (which is the first pull-down signal LG1 at this point) respectively, so as to maintain the drain voltage VD at the first voltage V1.

In an embodiment of the invention, when the drain voltage VD rises to become greater than the second voltage V2, the second control circuit 120 outputs the second pull-down signal LG2 as the pull-down control signal LGC, and the pull-down circuit 190 turns off the SR transistor MSR in response to the pull-down control signal LGC (which is the second pull-down signal LG2 at this point).

Figure 2:
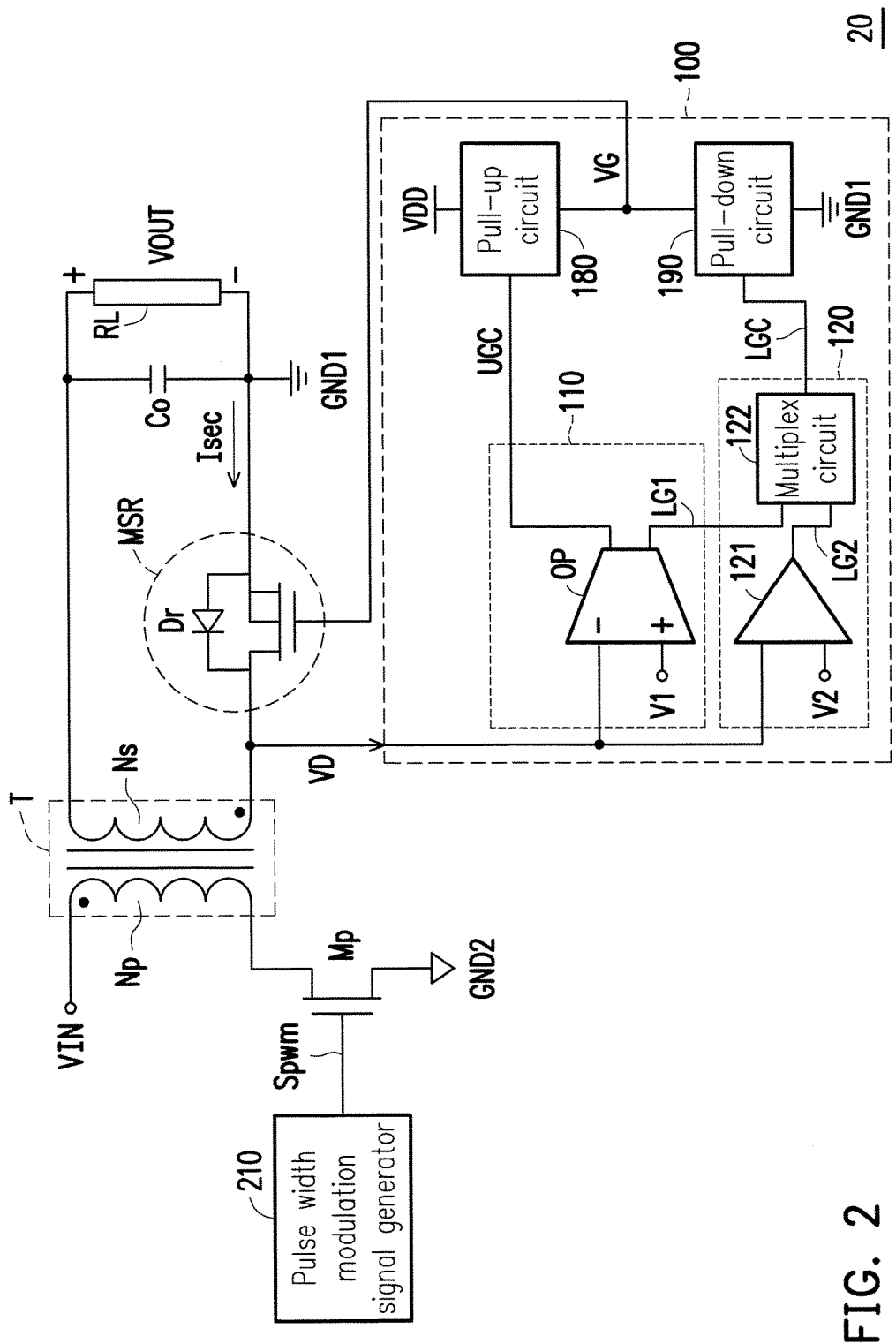
FIG. 2 is a schematic circuit diagram of a power conversion apparatus according to an embodiment of the invention.

The application of the SR controller will be described in more detail below. For convenience of description, the power conversion apparatus is described as a flyback structure in the following as an example, and the power conversion apparatus having other structures may be deduced by analogy. Referring to FIG. 2, FIG. 2 is a schematic circuit diagram of a power conversion apparatus 20 according to an embodiment of the invention. The power conversion apparatus 20 includes a transformer T, the SR transistor MSR, the SR controller 100, a power switch Mp, and a pulse width modulation signal generator 210, but the invention is not limited thereto. The transformer T includes a primary side Np and a secondary side Ns. A first terminal (for example, a common-polarity terminal, with a dot thereon in the drawing) of the primary side Np is used to receive an input voltage VIN, and a first terminal (for example, an opposite-polarity terminal, with no dot thereon in the drawing) of the secondary side Ns is used to provide an output voltage VOUT to a load RL (for example, an electronic apparatus), but the invention is not limited thereto.

A first terminal of the power switch MP is coupled to a second terminal (for example, an opposite-polarity terminal) of the primary side Np, a second terminal of the power switch Mp is coupled to a second ground terminal GND2, and a control terminal of the power switch Mp is coupled to the pulse width modulation signal generator 210 to receive a pulse width modulation signal Spwm. The pulse width modulation signal generator 210 generates and regulates the pulse width modulation signal Spwm according to a state of the load RL (or power supply requirements).

The drain terminal of the SR transistor MSR is coupled to a second terminal (for example, a common-polarity terminal) of the secondary side Ns. The source terminal and the body terminal of the SR transistor MSR are coupled to a first ground terminal GND1, wherein the parasitic diode Dr is provided between the drain terminal and the body terminal of the SR transistor MSR. The SR controller 100 is coupled to the drain terminal of the SR transistor MSR to receive the drain voltage VD. The SR controller 100 correspondingly generates the driving voltage VG according to a voltage level of the drain voltage VD, so as to control on and off of the SR transistor MSR.

The SR controller 100 includes the first control circuit 110, the second control circuit 120, the pull-up circuit 180, and the pull-down circuit 190. Details thereof can be found in the relevant description of the SR controller 100 of FIG. 1 and therefore will not be repeated herein. In an embodiment of the invention, the first control circuit 110 includes an operational amplifier OP, but the invention is not limited thereto. An inverting input terminal of the operational amplifier OP receives the drain voltage VD, a non-inverting input terminal of the operational amplifier OP receives the first voltage V1, and the operational amplifier OP amplifies the difference voltage between the drain voltage VD and the first voltage V1 to generate the pull-up control signal UGC and the first pull-down signal LG1.

In an embodiment of the invention, the second control circuit 120 includes a comparator 121 and a multiplex circuit 122. The comparator 121 receives the drain voltage VD and the second voltage V2, and compares the drain voltage VD with the second voltage V2 to generate the second pull-down signal LG2. The multiplex circuit 122 receives the first pull-down signal LG1, and is coupled to the comparator 121 to receive the second pull-down signal LG2. When the second pull-down signal LG2 indicates that the drain voltage VD is greater than the second voltage V2, the multiplex circuit 122 outputs the second pull-down signal LG2 as the pull-down control signal LGC, otherwise the multiplex circuit 122 outputs the first pull-down signal LG1 as the pull-down control signal LGC.

Figure 3:
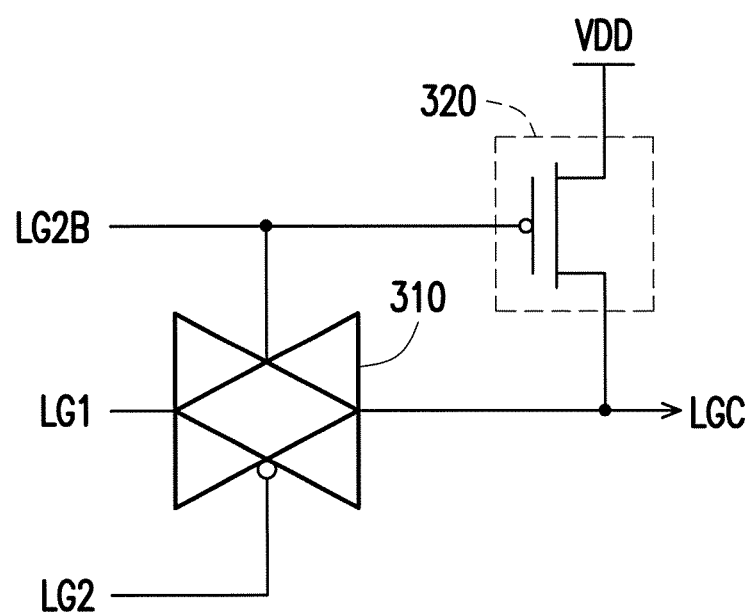
FIG. 3 is a schematic circuit diagram of a multiplex circuit according to an embodiment of the invention.

In an embodiment of the invention, as shown in FIG. 3, the multiplex circuit 122 includes a transmission gate 310 and a P-type transistor 320, but the invention is not limited thereto. An input terminal of the transmission gate 310 receives the first pull-down signal LG1. A non-inverting control terminal of the transmission gate 310 receives an inverted signal LG2B of the second pull-down signal LG2. An inverting control terminal of the transmission gate 310 receives the second pull-down signal LG2. A first terminal of the P-type transistor 320 is coupled to the power supply terminal VDD. A control terminal of the P-type transistor 320 is coupled to the non-inverting control terminal of the transmission gate 310 to receive the inverted signal LG2B of the second pull-down signal LG2. A second terminal of the P-type transistor 320 is coupled to an output terminal of the transmission gate 310 to provide the pull-down control signal LGC. In other embodiments of the invention, the multiplex circuit 122 may also be implemented using a known multiplexer or other types of multiplexers, depending on the actual application or design requirements.

Figure 4:
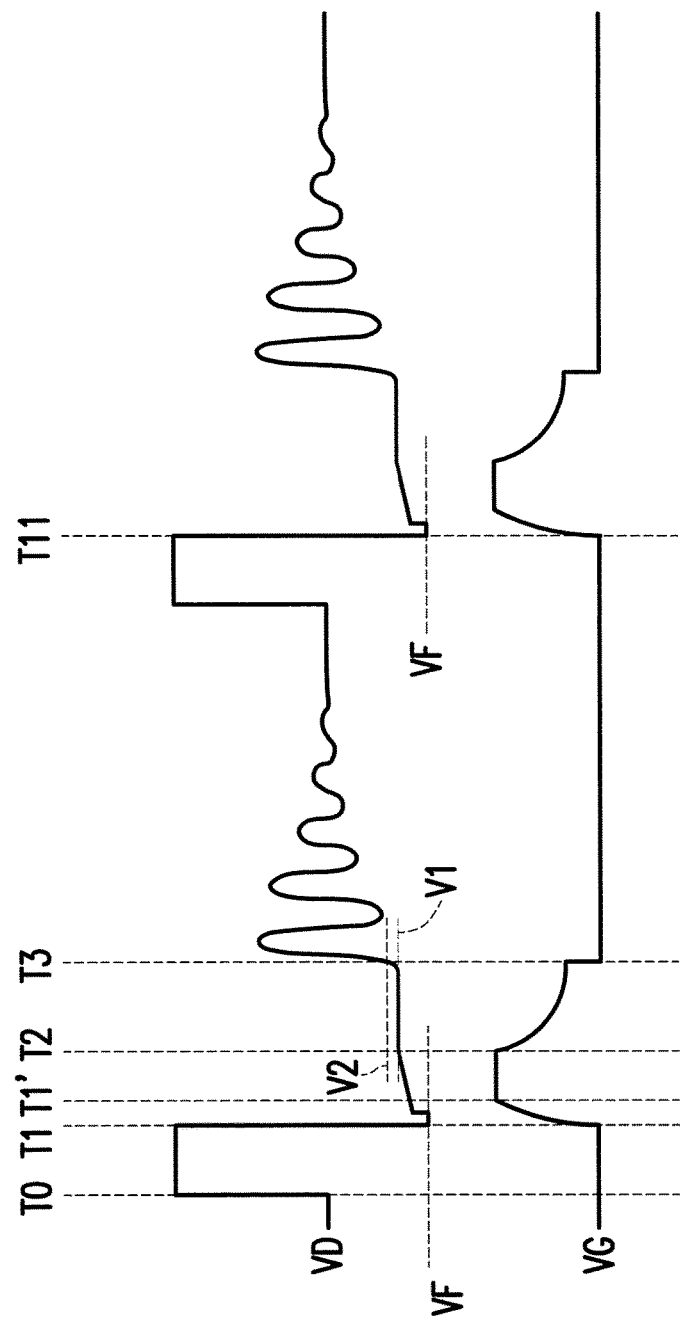
FIG. 4 is a schematic signal timing diagram of the SR controller and the SR transistor in FIG. 2.

In the following, referring to FIGS. 2 to 4 together, FIG. 4 is a schematic signal timing diagram of the SR controller 100 and the SR transistor MSR in FIG. 2. At time point T0 shown in FIG. 4, the power switch Mp is turned on, and the input voltage VIN provides electric power to a coil of the primary side Np of the transformer T for energy storage. The voltage level of the drain voltage VD of the SR transistor MSR is K×VIN, wherein K is a coil ratio between the secondary side Ns and the primary side Np of the transformer T, and at this point, the parasitic diode Dr of the SR transistor MSR is reverse biased and is in the off state. Since the voltage level of the drain voltage VD is greater than the second voltage V2, the comparator 121 generates, for example, the second pull-down signal LG2 with a logic high level, and the inverted signal LG2B of the second pull-down signal LG2 is at a logic low level, so that the transmission gate 310 in the multiplex circuit 122 is in the off state, and the P-type transistor 320 in the multiplex circuit 122 is in the on state, and thus the pull-down control signal LGC outputted by the multiplex circuit 122 is at a voltage level (namely, logic high level) of the power supply terminal VDD. In this way, the pull-down circuit 190 is in the on state based on the pull-down control signal LGC with a logic high level, so that the driving voltage VG is at a voltage level (namely, logic low level) of the first ground terminal GND1, and the SR transistor MSR is maintained in the off state.

At time point T1, the power switch Mp is cut off in response to the pulse width modulation signal Spwm generated by the pulse width modulation signal generator 210. Based on Lenz's law, the energy stored by the primary side Np of the transformer T will be transferred to the secondary side Ns of the transformer T. At the same time, the parasitic diode Dr of the SR transistor MSR is forward biased and is turned on. Since the body terminal of the SR transistor MSR is coupled to the first ground terminal GND1, the voltage level (namely, the drain voltage VD) of the drain terminal of the SR transistor MSR is reduced from K×VIN to a negative voltage value VF.

Since the drain voltage VD (which is the negative voltage value VF at this point) is smaller than the second voltage V2, the comparator 121 generates, for example, the second pull-down signal LG2 with a logic low level, and the inverted signal LG2B of the second pull-down signal LG2 is at a logic high level, so that the transmission gate 310 in the multiplex circuit 122 is turned on, and the P-type transistor 320 in the multiplex circuit 122 is turned off. On the other hand, the operational amplifier OP amplifies the difference voltage between the drain voltage VD and the first voltage V1 to generate the pull-up control signal UGC and the first pull-down signal LG1. Since the transmission gate 310 is turned on, the transmission gate 310 outputs the first pull-down signal LG1 as the pull-down control signal LGC. At this point, the pull-up circuit 180 and the pull-down circuit 190 gradually pull up the driving voltage VG from the logic low level, in response to the pull-up control signal UGC and the pull-down control signal LGC (which is the first pull-down signal LG1 at this point) respectively, and at time point T1', the driving voltage VG reaches the logic high level. In the process whereby the driving voltage VG is gradually pulled up from the logic low level, the SR transistor MSR may be turned on once the driving voltage VG rises to a threshold voltage value of the SR transistor MSR. As the SR transistor MSR is turned on, the parasitic diode Dr thereof is turned off, based on the fact that power consumption of the SR transistor MSR in the on state is much smaller as compared to power consumption of the parasitic diode Dr thereof in the on state, power loss during power conversion can be reduced.

As the energy transferred to the secondary side Ns of the transformer T continues to charge a capacitor Co via the turned-on SR transistor MSR, a current Isec of the secondary side Ns will gradually decline so that the voltage level of the drain voltage VD is gradually pulled up from the negative voltage value VF. When the voltage level of the drain voltage VD reaches the first voltage V1, as shown at time point T2, the operational amplifier OP in the first control circuit 110 starts to adjust the voltage levels of the pull-up control signal UGC and the first pull-down signal LG1, so that the pull-up circuit 180 and the pull-down circuit 190 regulate (reduce) the voltage level of the driving voltage VG, in response to the pull-up control signal UGC and the pull-down control signal LGC (which is the first pull-down signal LG1 at this point) respectively, so as to maintain the voltage level of the drain voltage VD at the first voltage V1.

Since the current Isec of the secondary side Ns will continue to decline, eventually leading to the voltage level of the drain voltage VD being unable to be maintained at the first voltage V1 and rising to become greater than the second voltage V2, as shown at time point T3. At this point, the energy stored in the transformer T has been completely transferred to the capacitor Co. Therefore, the current Isec of the secondary side Ns is reduced to zero. The comparator 121 generates, for example, the second pull-down signal LG2 with a logic high level, in response to the voltage level of the drain voltage VD being greater than the second voltage V2, so as to turn off the transmission gate 310 and turn on the P-type transistor 320, so that the pull-down control signal LGC is at the voltage level (namely, logic high level) of the power supply terminal VDD. Accordingly, the pull-down circuit 190 is turned on based on the pull-down control signal LGC with the logic high level, so that the driving voltage VG is at the voltage level (namely, logic low level) of the first ground terminal GND1 and the SR transistor MSR is quickly turned off. The SR transistor MSR is maintained in the off state until the next energy conversion is performed to again reduce the drain voltage VD to the negative voltage value VF, for example, as shown at time point T11.

In general, in the case where the drain voltage VD is smaller than the second voltage V2, the SR transistor MSR is controlled by the first control circuit 110 and is in the on state. In contrast, in the case where the voltage level of the drain voltage VD is greater than the second voltage V2, the SR transistor MSR is controlled by the second control circuit 120 and is in the off state.

Figure 5:
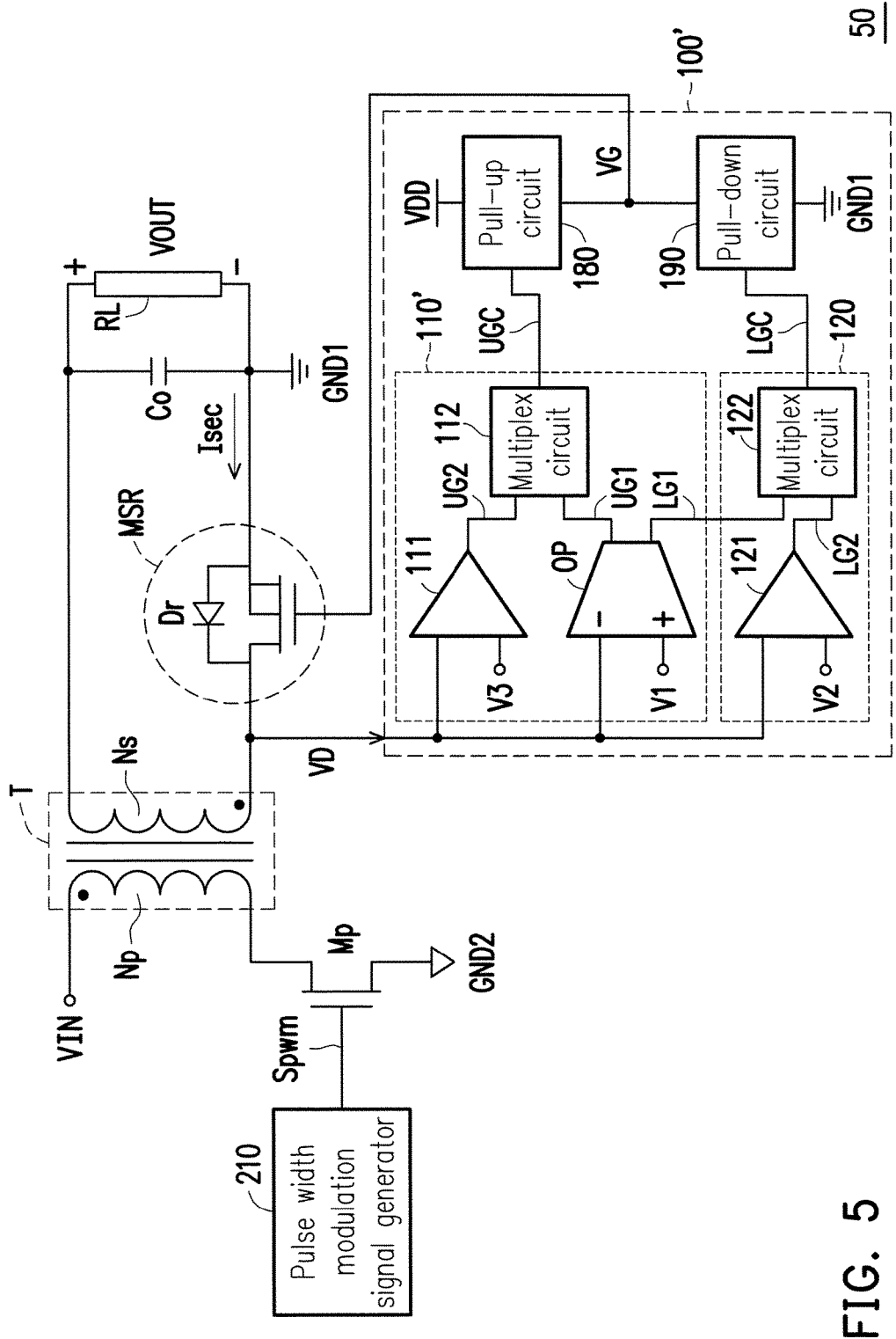
FIG. 5 is a schematic circuit diagram of the power conversion apparatus according to another embodiment of the invention.

Referring to FIG. 5, FIG. 5 is a schematic circuit diagram of a power conversion apparatus 50 according to another embodiment of the invention. The power conversion apparatus 50 also includes the transformer T, the SR transistor MSR, an SR controller 100', the power switch Mp, and the pulse width modulation signal generator 210, but the invention is not limited thereto. The transformer T, the SR transistor MSR, the power switch Mp and the pulse width modulation signal generator 210 of FIG. 5 are respectively similar to the transformer T, the SR transistor MSR, the power switch Mp and the pulse width modulation signal generator 210 of FIG. 2. Therefore, the implementation manners thereof can be found in the above relevant description and will not be repeated herein. The SR controller 100' includes a first control circuit 110', the second control circuit 120, the pull-up circuit 180, and the pull-down circuit 190, wherein the second control circuit 120, the pull-up circuit 180 and the pull-down circuit 190 of FIG. 5 are respectively similar to the second control circuit 120, the pull-up circuit 180 and the pull-down circuit 190 of FIG. 2. Therefore, the implementation manners thereof can be found in the above relevant description and will not be repeated herein. A description of the first control circuit 110' is provided as follows.

In the present embodiment, the first control circuit 110' amplifies the difference voltage between the drain voltage VD and the first voltage V1 to generate a first pull-up signal UG1 and the first pull-down signal LG1, wherein the first pull-up signal UG1 and the first pull-down signal LG1 may be a differential pair of signals. In addition, the first control circuit 110' further compares the drain voltage VD with a third voltage V3 to generate a second pull-up signal UG2. In an embodiment of the invention, the first voltage V1, the second voltage V2 and the third voltage V3 may be negative DC voltages, the third voltage V3 is lower than the first voltage V1, and the first voltage V1 is lower than the second voltage V2.

When the drain voltage VD is smaller than the third voltage V3, the first control circuit 110' outputs the second pull-up signal UG2 as the pull-up control signal UGC, and the pull-up circuit 180 quickly turns on the SR transistor MSR in response to the pull-up control circuit UGC (which is the second pull-up signal UG2). In contrast, when the drain voltage VD is greater than the third voltage V3, the first control circuit 110' outputs the first pull-up signal UG1 as the pull-up control signal UGC. Moreover, when the drain voltage VD rises to the first voltage V1 (the drain voltage VD is still lower than the second voltage V2 at this point), the pull-up circuit 180 and the pull-down circuit 190 regulate the driving voltage VG in response to the pull-up control signal UGC (which is the first pull-up signal UG1 at this point) and the pull-down control signal LGC (which is the first pull-down signal LG1 at this point) respectively, so as to maintain the drain voltage VD at the first voltage V1. Regarding the operation of the first control circuit 110', the detailed description will be provided later.

The first control circuit 110' includes the operational amplifier OP, a comparator 111, and a multiplex circuit 112, but the invention is not limited thereto. The inverting input terminal of the operational amplifier OP receives the drain voltage VD. The non-inverting input terminal of the operational amplifier OP receives the first voltage V1. The operational amplifier OP amplifies the difference voltage between the drain voltage VD and the first voltage V1 to generate the first pull-up signal UG1 and the first pull-down signal LG1. The comparator 111 receives the drain voltage VD and the third voltage V3, and compares the drain voltage VD with the third voltage V3 to generate the second pull-up signal UG2. The multiplex circuit 112 is coupled to the operational amplifier OP to receive the first pull-up signal UG1, and is coupled to the comparator 111 to receive the second pull-up signal UG2. When the second pull-up signal UG2 indicates that the drain voltage VD is smaller than the third voltage V3, the multiplex circuit 112 outputs the second pull-up signal UG2 as the pull-up control signal UGC, otherwise the multiplex circuit 112 outputs the first pull-up signal UG1 as the pull-up control signal UGC.

Figure 6:
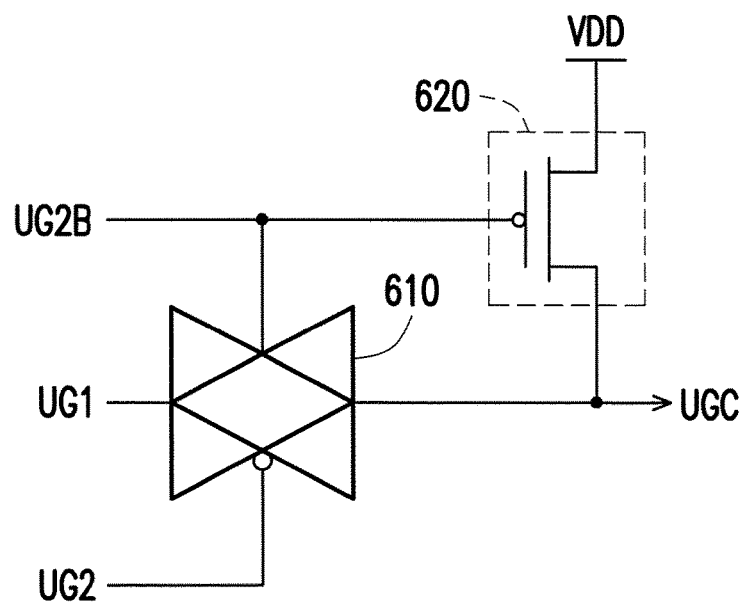
FIG. 6 is a schematic circuit diagram of the multiplex circuit according to an embodiment of the invention.

In an embodiment of the invention, as shown in FIG. 6, the multiplex circuit 112 includes a transmission gate 610 and a P-type transistor 620, but the invention is not limited thereto. An input terminal of the transmission gate 610 receives the first pull-up signal UG1. A non-inverting control terminal of the transmission gate 610 receives an inverted signal UG2B of the second pull-up signal UG2. An inverting control terminal of the transmission gate 610 receives the second pull-up signal UG2. A first terminal of the P-type transistor 620 is coupled to the power supply terminal VDD. A control terminal of the P-type transistor 620 is coupled to the non-inverting control terminal of the transmission gate 610 to receive the inverted signal UG2B of the second pull-up signal UG2. A second terminal of the P-type transistor 620 is coupled to an output terminal of the transmission gate 610 to provide the pull-up control signal UGC. In other embodiments of the invention, the multiplex circuit 112 may also be implemented using a known multiplexer or other types of multiplexers, depending on the actual application or design requirements.

Figure 7:
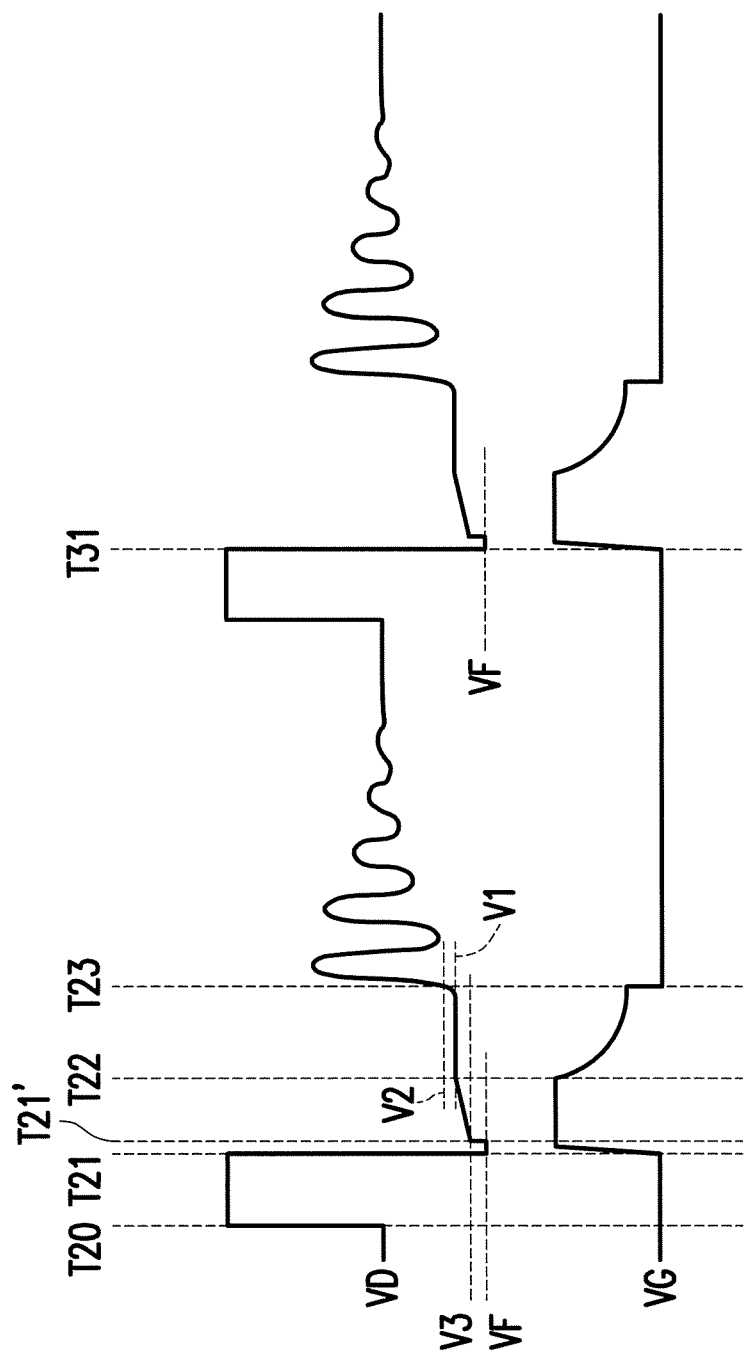
FIG. 7 is a schematic signal timing diagram of the SR controller and the SR transistor in FIG. 5.

Referring to FIG. 3 and FIGS. 5 to 7 together, FIG. 7 is a signal timing diagram of the SR controller 100' and the SR transistor MSR in FIG. 5, wherein the operation of the power conversion apparatus 50 of FIG. 5 at time point T20 shown in FIG. 7 is similar to the operation of the power conversion apparatus 20 of FIG. 2 at time point T0 shown in FIG. 4. Therefore, details thereof can be found in the relevant description of FIG. 4 and will not be repeated herein.

At time point T21, the power switch Mp is cut off in response to the pulse width modulation signal Spwm generated by the pulse width modulation signal generator 210. Based on Lenz's law, the energy stored by the primary side Np of the transformer T will be transferred to the secondary side Ns of the transformer T. At the same time, the parasitic diode Dr of the SR transistor MSR is forward biased and is turned on. Since the body terminal of the SR transistor MSR is coupled to the first ground terminal GND1, the voltage level (namely, the drain voltage VD) of the drain terminal of the SR transistor MSR is reduced from K×VIN to the negative voltage value VF.

Since the drain voltage VD (which is the negative voltage value VF at this point) is smaller than the second voltage V2, the comparator 121 generates, for example, the second pull-down signal LG2 with the logic low level, and the inverted signal LG2B of the second pull-down signal LG2 is the logic high level so that the transmission gate 310 in the multiplex circuit 122 is turned on, and the P-type transistor 320 in the multiplex circuit 122 is turned off. On the other hand, the operational amplifier OP amplifies the difference voltage between the drain voltage VD and the first voltage V1 to generate the first pull-up signal UG1 and the first pull-down signal LG1. Since the transmission gate 310 is turned on, the transmission gate 310 outputs the first pull-down signal LG1 as the pull-down control signal LGC so that the pull-down circuit 190 is controlled by the first pull-down signal LG1 to regulate the driving voltage VG. Moreover, since the drain voltage VD (which is the negative voltage value VF at this point) is smaller than the third voltage V3, the comparator 111 generates, for example, the second pull-up signal UG2 with a logic high level, and the inverted signal UG2B of the second pull-up signal UG2 is at a logic low level so that the transmission gate 610 in the multiplex circuit 112 is turned off, and the P-type transistor 620 in the multiplex circuit 112 is turned on. Consequently, the pull-up control signal UGC output by the multiplex circuit 112 is at the voltage level (namely, logic high level) of the power supply terminal VDD. Accordingly, the pull-up circuit 180 is turned on based on the pull-up control signal UGC with the logic high level, so that the driving voltage VG is at the voltage level (namely, logic high level) of the power supply terminal VDD, causing the SR transistor MSR to be quickly turned on, and the parasitic diode Dr to be quickly turned off. Therefore, as compared to the driving manner in FIG. 2 in which the first control circuit 110 gradually pulls up the driving voltage VG to a logic high level (as shown by the waveform of the driving voltage VG from time point T1 to time point T1' in FIG. 4), the first control circuit 110' of the present embodiment increases the speed of pulling up the driving voltage VG to the logic high level, so as to shorten the on time of the parasitic diode Dr. Therefore, the power conversion apparatus 50 has better conversion efficiency.

As the energy transferred to the secondary side Ns of the transformer T continues to charge the capacitor Co via the turned-on SR transistor MSR, the current Isec of the secondary side Ns will gradually decline so that the voltage level of the drain voltage VD is pulled up from the negative voltage value VF. When the voltage level of the drain voltage VD rises to become greater than the third voltage V3, as shown at time point T21', the comparator 111 generates, for example, the second pull-up signal UG2 with a logic low level, and the inverted signal UG2B of the second pull-up signal UG2 is at a logic high level so that the transmission gate 610 in the multiplex circuit 112 is turned on, and the P-type transistor 620 in the multiplex circuit 112 is turned off. Since the transmission gate 610 is turned on, the transmission gate 610 outputs the first pull-up signal UG1 as the pull-up control signal UGC. Moreover, since the transmission gate 310 is also in the on state, the transmission gate 310 outputs the first pull-down signal LG1 as the pull-down control signal LGC. In this way, the pull-up circuit 180 and the pull-down circuit 190 control the voltage level of the driving voltage VG in response to the pull-up control signal UGC (which is the first pull-up signal UG1 at this point) and the pull-down control signal LGC (which is the first pull-down signal LG1 at this point) respectively.

Since the operations of the power conversion apparatus 50 of FIG. 5 at time points T22, T23 and T31 shown in FIG. 7 are respectively similar to the operations of the power conversion apparatus 20 of FIG. 2 at time points T2, T3 and T11 shown in FIG. 4. Therefore, details thereof can be found in the relevant description of FIGS. 2 to 4 and will not be repeated herein.

In general, in the case where the drain voltage VD is smaller than the third voltage V3, the SR transistor MSR is controlled by the comparator 111 in the first control circuit 110' and is quickly turned on. In the case where the drain voltage VD is greater than the third voltage V3 and smaller than the second voltage V2, the SR transistor MSR is controlled by the operational amplifier OP in the first control circuit 110'. In the case where the voltage level of the drain voltage VD is greater than the second voltage V2, the SR transistor MSR is controlled by the comparator 121 in the second control circuit 120 and is turned off.

Figure 8:
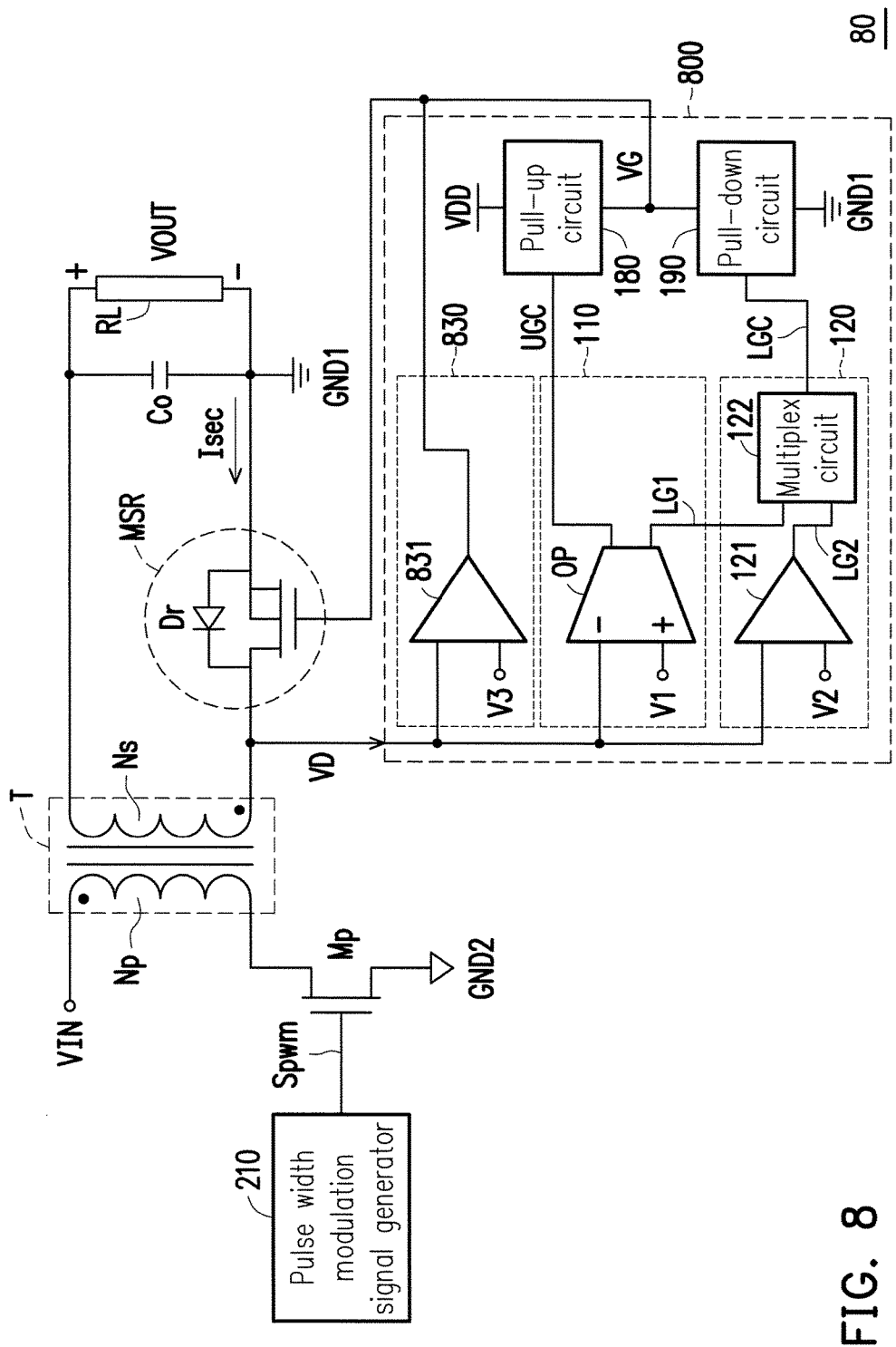
FIG. 8 is a schematic circuit diagram of the power conversion apparatus according to yet another embodiment of the invention.

Referring to FIG. 8, FIG. 8 is a schematic circuit diagram of a power conversion apparatus 80 according to yet another embodiment of the invention. The power conversion apparatus 80 also includes, the transformer T, the SR transistor MSR, an SR controller 800, the power switch Mp, and the pulse width modulation signal generator 210, but the invention is not limited thereto. The transformer T, the SR transistor MSR, the power switch Mp and the pulse width modulation signal generator 210 of FIG. 8 are respectively similar to the transformer T, the SR transistor MSR, the power switch Mp and the pulse width modulation signal generator 210 of FIG. 2. Therefore, the implementation manners thereof can be found in the above relevant description and will not be repeated herein. The SR controller 800 includes the first control circuit 110, the second control circuit 120, a third control circuit 830, the pull-up circuit 180, and the pull-down circuit 190, wherein the first control circuit 110, the second control circuit 120, the pull-up circuit 180 and the pull-down circuit 190 of FIG. 8 are respectively similar to the first control circuit 110, the second control circuit 120, the pull-up circuit 180 and the pull-down circuit 190 of FIG. 2. Therefore, the implementation manners thereof can be found in the above relevant description and will not be repeated herein. A description of the implementation manner of the third control circuit 830 is provided as follows.

The third control circuit 830 is coupled to the drain terminal of the SR transistor MSR to receive the drain voltage VD, and compares the drain voltage VD with the third voltage V3. In an embodiment of the invention, the first voltage V1, the second voltage V2 and the third voltage V3 may be negative DC voltages, the third voltage V3 is lower than the first voltage V1, and the first voltage V1 is lower than the second voltage V2. When the drain voltage VD is smaller than the third voltage V3, the third control circuit 830 generates the driving voltage VG directly so as to turn on the SR transistor MSR quickly. Regarding the operation of the third control circuit 830, the detailed description will be provided later.

In an embodiment of the invention, the third control circuit 830 includes a comparator 831, but the invention is not limited thereto. The comparator 831 has a first input terminal, a second input terminal, and an output terminal. The first input terminal of the comparator 831 is coupled to the drain terminal of the SR transistor MSR to receive the drain voltage VD. The second input terminal of the comparator 831 is coupled to the third voltage V3. The output terminal of the comparator 831 outputs the driving voltage VG.

The signal timing of the SR controller 800 and the SR transistor MSR of the embodiment is similar to the signal timing illustrated in FIG. 7. Therefore, referring to FIGS. 7 and 8 together, wherein the operation of the power conversion apparatus 80 at time point T20 shown in FIG. 7 is similar to the operation of the power conversion apparatus 20 of FIG. 2 at time point T0 shown in FIG. 4. Therefore, details thereof can be found in the relevant description of FIG. 4 and will not be repeated herein.

At time point T21, the power switch Mp is cut off in response to the pulse width modulation signal Spwm generated by the pulse width modulation signal generator 210. Based on Lenz's law, the energy stored by the primary side Np of the transformer T will be transferred to the secondary side Ns of the transformer T. At the same time, the parasitic diode Dr of the SR transistor MSR is forward biased and is turned on. Since the body terminal of the SR transistor MSR is coupled to the first ground terminal GND1, the voltage level (namely, the drain voltage VD) of the drain terminal of the SR transistor MSR is reduced from K×VIN to the negative voltage value VF. At this point, the operations of the first control circuit 110 and the second control circuit 120 of FIG. 8 are respectively similar to the operations of the first control circuit 110 and the second control circuit 120 of FIG. 2. Therefore, details thereof can be found in the relevant description and will not be repeated herein. It is worth mentioning that, since the drain voltage VD (which is the negative voltage value VF at this point) is smaller than the third voltage V3, the comparator 831 in the third control circuit 830 generates, for example, the driving voltage VG with a logic high level, so to quickly turn on the SR transistor MSR and turn off the parasitic diode Dr. Therefore, as compared to the driving manner in FIG. 2 in which the first control circuit 110 gradually pulls up the driving voltage VG to the logic high level (as shown by the waveform of the driving voltage VG from time point T1 to time point T1' in FIG. 4), the third control circuit 830 of the present embodiment increases the speed of pulling up the driving voltage VG to the logic high level, so as to shorten the on time of the parasitic diode Dr. Therefore, the power conversion apparatus 80 has better conversion efficiency.

As the energy transferred to the secondary side Ns of the transformer T continues to charge the capacitor Co via the turned-on SR transistor MSR, the current Isec of the secondary side Ns will gradually decline so that the voltage level of the drain voltage VD is gradually pulled up from the negative voltage value VF. When the voltage level of the drain voltage VD rises to become greater than the third voltage V3, as shown at time point T21', the third control circuit 830 will stop supplying the driving voltage VG, i.e., an output terminal of the third control circuit 830 is in a high impedance state, and the SR transistor MSR will be controlled by the first control circuit 110, i.e., the pull-up circuit 180 and the pull-down circuit 190 will control the voltage level of the driving voltage VG in response to the pull-up control signal UGC and the pull-down control signal LGC (which is the first pull-down signal LG1 at this point) respectively. In addition, the operations of the power conversion apparatus 80 of FIG. 8 at time points T22, T23 and T31 shown in FIG. 7 are respectively similar to the operations of the power conversion apparatus 20 of FIG. 2 at time points T2, T3 and T11 shown in FIG. 4. Therefore, details thereof can be found in the relevant description of FIG. 4 and will not be repeated herein.

In general, in the case where the drain voltage VD is smaller than the third voltage V3, the SR transistor MSR is controlled by the comparator 831 in the third control circuit 830 and is quickly turned on. In the case where the drain voltage VD is greater than the third voltage V3 and smaller than the second voltage V2, the SR transistor MSR is controlled by the operational amplifier OP of the first control circuit 110. In the case where the voltage level of the drain voltage VD is greater than the second voltage V2, the SR transistor MSR is controlled by the comparator 121 of the second control circuit 120 and is turned off.

In summary, the power conversion apparatus and the SR controller thereof as proposed by the embodiment of the invention correspondingly control on and off of the SR transistor according to the drain voltage of the SR transistor, so as to enhance the conversion efficiency of the power conversion apparatus.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A synchronous rectification (SR) controller for driving an SR transistor, the SR controller comprising:
 a first control circuit, coupled to a drain terminal of the SR transistor to receive a drain voltage, and generating a pull-up control signal and a first pull-down signal according to the drain voltage and a first voltage;
 a second control circuit, coupled to the drain terminal of the SR transistor to receive the drain voltage, and coupled to the first control circuit to receive the first pull-down signal, the second control circuit comparing the drain voltage with a second voltage to generate a second pull-down signal, and outputting the first pull-down signal or the second pull-down signal as a pull-down control signal;
 a pull-up circuit, coupled between a power supply terminal and a gate terminal of the SR transistor, and coupled to the first control circuit to receive the pull-up control signal; and
 a pull-down circuit, coupled between a ground terminal and the gate terminal of the SR transistor, and coupled to the second control circuit to receive the pull-down control signal,
 wherein the pull-up circuit and the pull-down circuit regulate a driving voltage on the gate terminal of the SR transistor in response to the pull-up control signal and the pull-down control signal respectively,
 when the drain voltage is greater than the second voltage, the second control circuit outputs the second pull-down signal as the pull-down control signal, and the pull-down circuit turns off the SR transistor in response to the pull-down control signal, when the drain voltage is smaller than the second voltage, the second control circuit outputs the first pull-down signal as the pull-down control signal, and the pull-up circuit and the pull-down circuit turn on the SR transistor in response to the pull-up control signal and the pull-down control signal respectively.

2. The SR controller according to claim 1, wherein:

the first control circuit amplifies a difference voltage between the drain voltage and the first voltage to generate the pull-up control signal and the first pull-down signal; and when the drain voltage rises to the first voltage, the pull-up circuit and the pull-down circuit regulate the driving voltage in response to the pull-up control signal and the pull-down control signal respectively, so as to maintain the drain voltage at the first voltage, wherein the first voltage is smaller than the second voltage.

3. The SR controller according to claim 2, wherein the first control circuit comprises:

an operational amplifier, an inverting input terminal of the operational amplifier receiving the drain voltage, a non-inverting input terminal of the operational amplifier receiving the first voltage, and the operational amplifier accordingly generating the pull-up control signal and the first pull-down signal.

4. The SR controller according to claim 1, wherein the second control circuit comprises:

a comparator, receiving the drain voltage and the second voltage, and comparing the drain voltage with the second voltage to generate the second pull-down signal; and a multiplex circuit, receiving the first pull-down signal, and coupled to the comparator to receive the second pull-down signal, wherein when the second pull-down signal indicates that the drain voltage is greater than the second voltage, the multiplex circuit outputs the second pull-down signal as the pull-down control signal, otherwise the multiplex circuit outputs the first pull-down signal as the pull-down control signal.

5. The SR controller according to claim 4, wherein the multiplex circuit comprises:

a transmission gate, an input terminal of the transmission gate receiving the first pull-down signal, a non-inverting control terminal of the transmission gate receiving an inverted signal of the second pull-down signal, and an inverting control terminal of the transmission gate receiving the second pull-down signal; and a P-type transistor, a first terminal of the P-type transistor being coupled to the power supply terminal, a control terminal of the P-type transistor being coupled to the non-inverting control terminal of the transmission gate to receive the inverted signal of the second pull-down signal, and a second terminal of the P-type transistor being coupled to an output terminal of the transmission gate to provide the pull-down control signal.

6. The SR controller according to claim 1, further comprising:

a third control circuit, coupled to the drain terminal of the SR transistor to receive the drain voltage, and comparing the drain voltage with a third voltage, wherein when the drain voltage is smaller than the third voltage, the third control circuit generates the driving voltage to turn on the SR transistor, wherein the first voltage, the second voltage and the third voltage are negative DC voltages, the third voltage is lower than the first voltage, and the first voltage is lower than the second voltage.

7. The SR controller according to claim 6, wherein the third control circuit comprises:

a comparator, having a first input terminal, a second input terminal and an output terminal, wherein the first input terminal is coupled to the drain terminal of the SR transistor to receive the drain voltage, the second input terminal is coupled to the third voltage, and the output terminal outputs the driving voltage.

8. The SR controller according to claim 1, wherein:

the first control circuit amplifies a difference voltage between the drain voltage and the first voltage to generate a first pull-up signal and the first pull-down signal;

the first control circuit compares the drain voltage with a third voltage to generate a second pull-up signal, and when the drain voltage is smaller than the third voltage, the first control circuit outputs the second pull-up signal as the pull-up control signal, and the pull-up circuit turns on the SR transistor in response to the pull-up control signal, wherein the first voltage, the second voltage and the third voltage are negative DC voltages, the third voltage is lower than the first voltage, and the first voltage is lower than the second voltage.

9. The SR controller according to claim 8, wherein:

when the drain voltage is greater than the third voltage, the first control circuit outputs the first pull-up signal as the pull-up control signal, when the drain voltage rises to the first voltage, the pull-up circuit and the pull-down circuit regulate the driving voltage in response to the pull-up control signal and the pull-down control signal respectively, so as to maintain the drain voltage at the first voltage.

10. The SR controller according to claim 9, wherein the first control circuit comprises:

an operational amplifier, an inverting input terminal of the operational amplifier receiving the drain voltage, a non-inverting input terminal of the operational amplifier receiving the first voltage, and the operational amplifier accordingly generating the first pull-up signal and the first pull-down signal;

a comparator, receiving the drain voltage and the third voltage, and comparing the drain voltage with the third voltage to generate the second pull-up signal; and a multiplex circuit, coupled to the operational amplifier to receive the first pull-up signal, and coupled to the comparator to receive the second pull-up signal, wherein when the second pull-up signal indicates that the drain voltage is smaller than the third voltage, the multiplex circuit outputs the second pull-up signal as the pull-up control signal, otherwise the multiplex circuit outputs the first pull-up signal as the pull-up control signal.

11. A power conversion apparatus, comprising:

a transformer having a primary side and a secondary side, wherein a first terminal of the primary side is configured to receive an input voltage, and a first terminal of the secondary side is configured to provide an output voltage to a load;

a synchronous rectification (SR) transistor, a drain terminal of the SR transistor being coupled to a second terminal of the secondary side, a source terminal of the SR transistor being coupled to a ground terminal, and a gate terminal of the SR transistor receiving a driving voltage; and an SR controller, comprising:
- a first control circuit, coupled to the drain terminal of the SR transistor to receive a drain voltage, and generating a pull-up control signal and a first pull-down signal according to the drain voltage and a first voltage;
- a second control circuit, coupled to the drain terminal of the SR transistor to receive the drain voltage, and coupled to the first control circuit to receive the first pull-down signal, the second control circuit comparing the drain voltage with a second voltage to generate a second pull-down signal, and outputting the first pull-down signal or the second pull-down signal as a pull-down control signal;
- a pull-up circuit, coupled between a power supply terminal and the gate terminal of the SR transistor, and coupled to the first control circuit to receive the pull-up control signal; and
- a pull-down circuit, coupled between the ground terminal and the gate terminal of the SR transistor, and coupled to the second control circuit to receive the pull-down control signal,
- wherein the pull-up circuit and the pull-down circuit regulate the driving voltage in response to the pull-up control signal and the pull-down control signal respectively,
- when the drain voltage is greater than the second voltage, the second control circuit outputs the second pull-down signal as the pull-down control signal, and the pull-down circuit turns off the SR transistor in response to the pull-down control signal,
- when the drain voltage is smaller than the second voltage, the second control circuit outputs the first pull-down signal as the pull-down control signal, and the pull-up circuit and the pull-down circuit turn on the SR transistor in response to the pull-up control signal and the pull-down control signal respectively.

* * * * *